Figure 1:
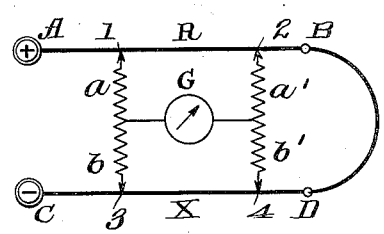

No. 834,162. PATENTED OCT. 23, 1906.
E. F. NORTHRUP.
ELECTRICAL RESISTANCE PYROMETRY.
APPLICATION FILED JUNE 16, 1906.

2 SHEETS—SHEET 1.

Witnesses
Inventor
E. F. Northrup,
by John H. Holt
his Attorney

No. 834,162. PATENTED OCT. 23, 1906.
E. F. NORTHRUP.
ELECTRICAL RESISTANCE PYROMETRY.
APPLICATION FILED JUNE 16, 1906.
2 SHEETS—SHEET 2.
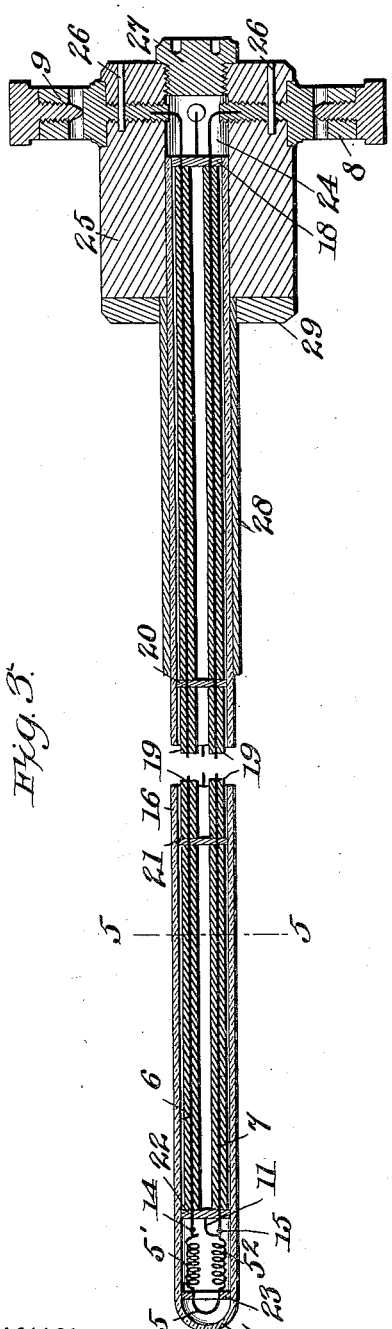
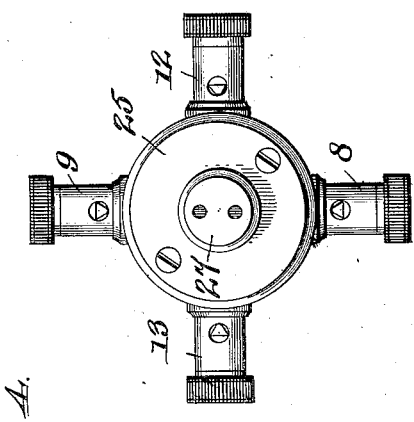
Witnesses
Inventor
E. F. Northrup
by John H. Hall
his Attorney

UNITED STATES PATENT OFFICE.

EDWIN F. NORTHRUP, OF PHILADELPHIA, PENNSYLVANIA, ASSIGNOR TO THE LEEDS & NORTHRUP COMPANY, OF PHILADELPHIA, PENNSYLVANIA, A CORPORATION OF PENNSYLVANIA.

ELECTRICAL-RESISTANCE PYROMETRY.

No. 834,162.   Specification of Letters Patent.   Patented Oct. 23, 1906.

Application filed June 16, 1906. Serial No. 322,063.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Electrical-Resistance Pyrometry, of which the following is a specification.

There are two general methods of measuring temperatures electrically. One is known as "thermo-electric" pyrometry and the other as "electrical-resistance" pyrometry.

In thermo-electric pyrometry temperature is measured by means of the thermo-electric couple by measuring the electromotive forces that are set up when the junctions of the dissimilar metals comprising the couple are exposed to different temperatures.

In electrical-resistance pyrometry temperature is measured by the changes in electrical resistance of a conductor, usually a platinum wire, and depends upon the property of such conductor to change in resistance with the temperature.

There are also in use two methods of electrical resistance pyrometry, one known as the "Wheatstone-bridge" method and the other as the "potentiometer" method. In the former the temperature is measured by balancing the resistance of the slide-wire of a Wheatstone bridge, the scale of which is calibrated in degrees of temperature with the resistance of a high-resistance coil of an electrical-resistance thermometer.

In the potentiometer method the temperature is measured by comparing the potential drop over the high-resistance coil of an electrical-resistance thermometer with the drop in potential through a standard known resistance by means of a potentiometer. In the thermometer used in this method the measuring-current is led to and away from the resistance-coil by two current-leads, and two other leads known as "potential-leads," pass down the stem of the thermometer and are tapped onto the terminals of the resistance-coil.

The method employed in carrying out the present invention is both a potential method and a bridge method, though employing neither the Wheatstone bridge nor the potentiometer. It differs also from the foregoing methods in that in the thermometer employed the high-resistance coil mentioned in connection with the foregoing methods may be supplanted by a coil of low resistance, though the two current-leads and potential-leads are still employed. This method may therefore be called a "potential-bridge" method, in which the temperature is measured by comparing the potential drop of a low-resistance coil of an electrical-resistance thermometer with the potential drop through the resistance of the slide-wire of a Kelvin low-resistance bridge.

The resistance-thermometer as designed for high-temperature work if wound to a suitable resistance for use in either the Wheatstone-bridge or potentiometer method is necessarily of considerable size. This unfits such thermometers as compared with thermocouples for taking the temperatures of small places or points. Moreover, these thermometers besides requiring considerable skill to construct are costly and more or less fragile, the resistance usually consisting of a coil of fine platinum wire wound upon a delicate mica support, while the leads to the coil are supported by delicate mica washers.

The disadvantages above pointed out, as well as others encountered in electrical-resistance pyrometry, are sought to be overcome by the present invention.

In order to fully describe my said invention, reference will be had to the accompanying drawings, forming a part of this application, and in which—

Figure 2:
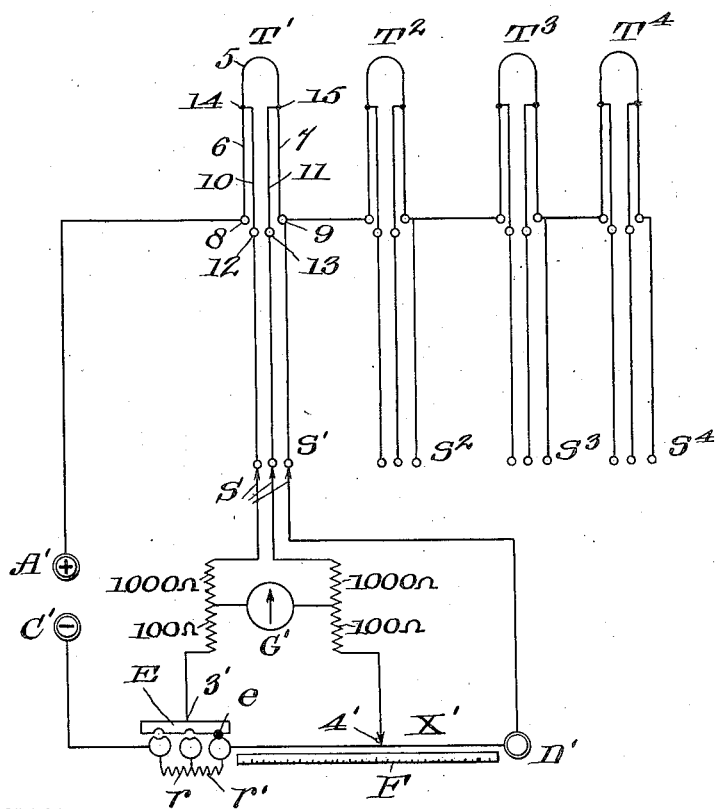

Figure 1 is a diagram of the connections of a Kelvin bridge for measuring low resistances; Fig. 2, a diagram of electrical connections employed in carrying out the present invention; Fig. 3, a longitudinal central sectional view of an electrical-resistance thermometer embodying my present invention; Fig. 4, an end elevation of the same; and Fig. 5, a section taken on the line 5 5, Fig. 3.

The bridge connections devised by Lord Kelvin for the measurement of low resistances is well known in the art; but since they constitute such an important part of the present invention a brief description thereof will be given, reference being had to Fig. 1. A Kelvin bridge consists, essentially, of a low-resistance conductor embraced between the points A B, which is usually a standard of comparison; a low-resistance conductor embraced between the points C D, which is usually the conductor whose resistance is to be measured or compared with the resistance of the conductor between A B; a low-resistance yoke B D; resistances $a$ $a'$ of known value, connected by contacts 1 and 2, one or both of which may be movable, to conductor A B; resistances $b$ $b'$ of known value, connected by contacts 3 and 4, respectively, one or both of which may be movable, to conductor C D; a galvanometer G, connected between resistances $a$ and $b$ on one side and between resistances $a'$ and $b'$ on the other side, and terminals A and C for connection to a source of electric current. Calling the resistance between 1 and 2 R and between 3 and 4 X, the bridge is balanced when $$\frac{a}{b} = \frac{a'}{b'} = \frac{X}{R}$$

the first two terms being made equal by construction, $$X = \frac{a}{b} R$$

Therefore, since $a$ $b$ and R are all known values the unknown value X may be readily determined.

In using the Kelvin bridge for the measurement of temperatures according to my invention it is not necessary to determine any actual values of resistance. It is only necessary that the resistance of the resistance-wire of the thermometer for a given temperature shall balance that of a given length of conductor included between two points on the bridge or slide wire, so that the length of said latter conductor may be laid off in degrees of temperature corresponding to different points thereon of the sliding bridge-contacts, which will effect a balance with the resistance of the thermometer resistance-wire at those temperatures. By the Kelvin-bridge connections .01 ohm may be measured with as great precision as one hundred ohms may be measured by the ordinary bridge methods. By taking advantage of the Kelvin bridge as a reading device I have found that high temperatures may be measured by the use of a very low resistance thermometer, which is a great advantage, as above pointed out.

Connections whereby temperatures may be measured by one or several thermometers according to my invention are shown in Fig. 2, where T', T², T³, and T⁴ represent four potential-point thermometers of low resistance, each having a small-resistance conductor 5, preferably of No. 20 Haraeus platinum wire having a resistance of about .05 ohms at 20° centigrade; 6 and 7, current-leads passing from binding-posts 8 and 9 to the terminals of said resistance 5, and 10 and 11 potential-leads passing from binding-posts 12 and 13 to potential points 14 and 15, where they are fused to the resistance-wire 5.

A' C' represent the bridge-terminals for connection to the source of measuring-current; C' D', the bridge or slide wire; $r$ $r'$, two resistance-coils for extending the range of said bridge-wire; E a plug-switch for said resistance-coils; 1000 $\Omega$ and 100 $\Omega$, the four ratio-coils corresponding to resistances $a$ $a'$ and $b$ $b'$, Fig. 1; G', the bridge-galvanometer; F, a scale for the bridge-wire, laid off in degrees of temperature, and 4' a sliding contact for said wire.

To measure temperature by one of the thermometers—T', for example—the binding-post 9 is connected to the post D' to form the yoke of the bridge corresponding to the conductor B D, Fig. 1, the binding-post 8 is connected to the positive binding-post A', and the potential-lead binding-posts 12 and 13 are connected to the two resistances indicated 1000 $\Omega$. The plug $e$ is inserted in one of the sockets of its switch, and the contact 4' is slid along the bridge-wire until the galvanometer shows no deflection. When this occurs, the potential drop over 3' 4' will equal the potential drop over 14 15—that is, over resistance-wire of thermometer—which shows that the resistance between 3' and 4' equals resistance of wire 5 between 14 and 15. Therefore if the bridge-wire is provided with a scale F laid off in degrees of temperature and calibrated so that each degree-mark will correspond to a position of the sliding contact 4', which will effect a balance of the bridge when the resistance-coil of the thermometer is subjected to that degree of temperature, it will be readily seen that the bridge may be made to read directly in degrees of temperature.

The arrangement of connections shown is of course not confined to the specific values of the ratio-coils given, as these may range as high as five thousand ohms or more or may be lower than that heretofore stated.

By connecting the potential-leads of each thermometer and the right-hand current-conductor of the several thermometers, respectively, to three contacts of the switches S', S², S³, and S⁴ and providing the bridges with movable contacts S, which may be shifted from one set of contacts to the next, temperatures may be measured with the several thermometers, at the same time keeping the resistance of the yoke of the bridge low, as required by theory.

A low-resistance thermometer constructed according to my invention is shown in Figs. 3 to 5, inclusive, where parts corresponding to those mentioned in connection with Fig. 2 are indicated by similar reference-numerals. This thermometer consists, among other parts, of a tube 16, preferably of porcelain or other suitable substance, hermetically closed at one end, as at 17, and closed at its other end by a plug or mica washer 18. Within this tube are located four non-conducting tubes 19, preferably of porcelain, through which pass the current-carrying wires 6 7 and the potential-leads 10 11, the said tubes being supported by washers 18, 20, 21, and 22, of mica or other suitable material. The resistance-wire 5 is preferably coiled into two spirals 5' and $5^2$ and is supported at one end in a washer 23, preferably of mica. The other end of the tube 16 extends into and fits tightly an opening 24, passing longitudinally through the center of a cylindrical head 25, preferably of boxwood, to which are secured the four terminal binding-posts 8, 9, 12, and 13, to which are connected the current-carrying and potential leads, as shown. Each of said binding-posts is held against rotation in said head by a key 26. The end of the central opening of the head 25 nearest the binding-posts is closed by a screw-plug 27. By removing this plug the terminal connections between the lead-wires and the binding-posts may be readily gotten at.

Surrounding the tube 16 for a short distance from the head of the thermometer is a metal tube 28, which is brazed at one end into a metal cap 29, fixed to one end of the head 25.

The current and potential leads are preferably of a cheaper grade of platinum than the resistance-wire 5. This is an advantage, on account of the fact that impure platinum has a lower temperature coefficient than that of pure platinum.

A thermometer constructed as above described is a great deal simpler and easier to make than the fragile and delicate resistance-thermometers at present in use for measuring high temperatures, and, owing to the fact that they may be made smaller than those hitherto employed, thermometers constructed according to my invention may be used in places where it is impracticable to use the others. Moreover, in the method herein employed the measuring-current does not have to be held constant during the measurement, as in the case of the potentiometer method—that is, it is independent of the variations in said current.

What I claim is—

1. A low-resistance thermometer, having potential-leads and current-leads, and a Kelvin bridge in which said leads are connected, to measure temperatures.

2. A low-resistance thermometer, having potential-leads and current-leads, and a Kelvin bridge in which said leads are connected to measure temperatures, said bridge being arranged to read directly in degrees of temperatures.

3. A plurality of low-resistance thermometers each having potential-leads and current-leads, a Kelvin bridge, and means to connect one or more of said thermometers in said bridge to measure temperatures.

4. An electrical-resistance thermometer comprising a tube, a low-resistance temperature-measuring conductor mounted in said tube near one end thereof, current-leads passing down said tube to said conductor, and potential-leads passing down said tube to potential points on said conductor.

5. An electrical-resistance thermometer, comprising a porcelain tube, a low-resistance temperature-measuring conductor within said tube near one end thereof, supports for said conductor, insulating-tubes within said porcelain tube and extending approximately the length thereof, current-leads and potential-leads each passing down a separate one of said insulating-tubes and connected to the said resistance-conductor, a head into which one end of said porcelain tube extends, binding-posts on said head connected with said current and potential leads, an exterior metal tube fitting over the porcelain tube near said head, and a metal cap into which said metal tube extends, secured to the face of said head.

In testimony whereof I affix my signature in presence of two witnesses.

EDWIN F. NORTHRUP.

Witnesses:
W. L. SWETLAND,
JULIUS BERNSTEIN.